April 26, 1938. B. H. SAVAGE 2,115,244
HYDRAULIC CLUTCH
Filed Feb. 7, 1934 3 Sheets-Sheet 1

Inventor
BASIL H. SAVAGE
By A. B. Bowman
Attorney

April 26, 1938.  B. H. SAVAGE  2,115,244
HYDRAULIC CLUTCH
Filed Feb. 7, 1934  3 Sheets-Sheet 2

Inventor
BASIL H. SAVAGE
By A. B. Bowman
Attorney

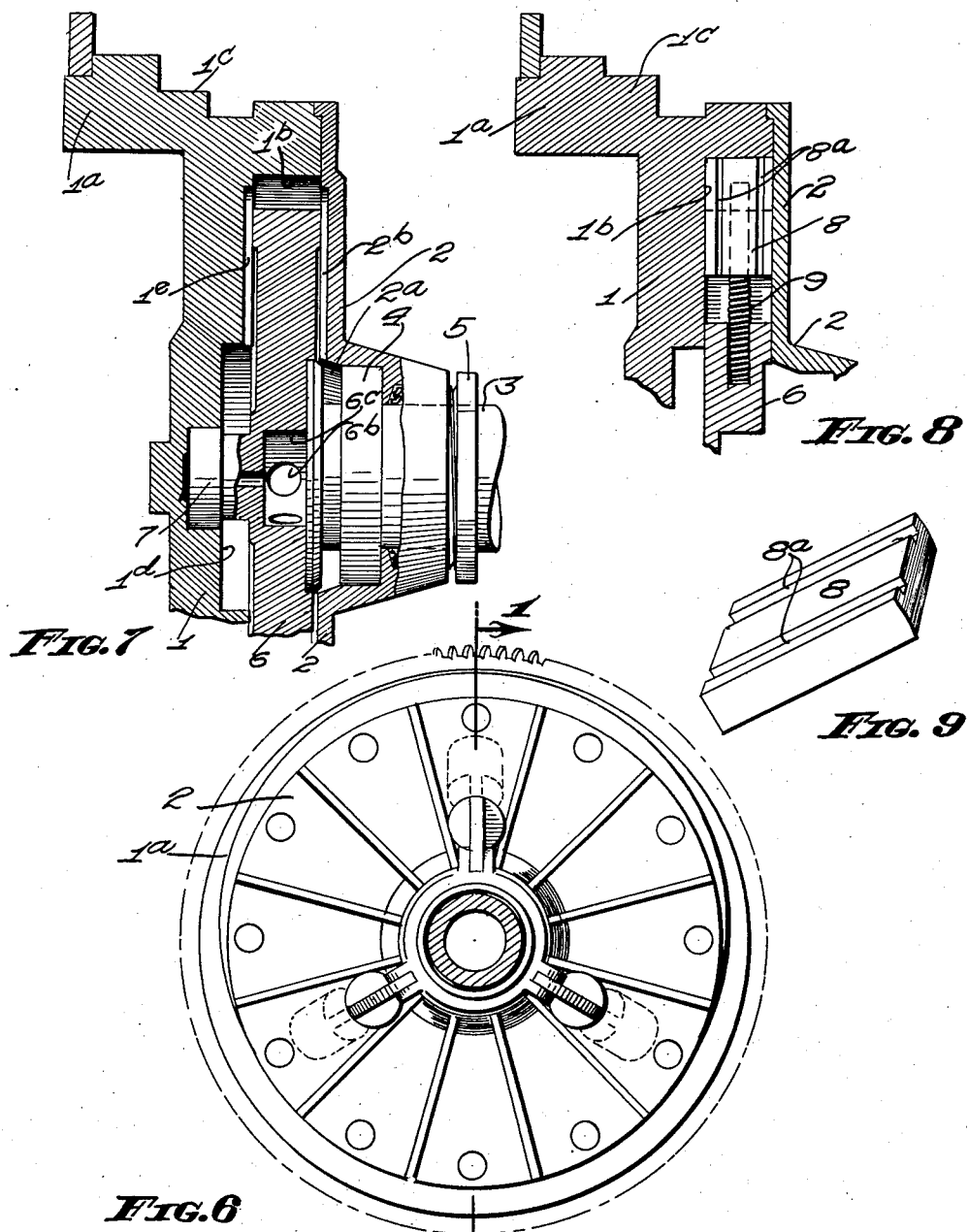

Patented Apr. 26, 1938

2,115,244

UNITED STATES PATENT OFFICE 2,115,244

HYDRAULIC CLUTCH

Basil H. Savage, San Diego, Calif., assignor to Savage Research Corporation, San Diego, Calif.

Application February 7, 1934, Serial No. 710,118

2 Claims. (Cl. 192—58)

My invention relates to hydraulic clutches, and the objects of my invention are:

First, to provide a hydraulic clutch which incorporates automatic means for bypassing oil when the load on the clutch exceeds a predetermined amount so that the speed of the engine and the driving side of the clutch may be maintained when the load on the driven side is increased, thereby eliminating overloading of the engine as well as excessive pressure in the clutch mechanism;

Second, to provide a hydraulic clutch which is particularly compact of construction so that it may be mounted between the engine and transmission of a conventional vehicle;

Third, to provide a hydraulic clutch which is so arranged that it only partially engages when the clutch pedal is released and complete engagement is delayed until the speed of the driven side reaches a predetermined amount;

Fourth, to provide a hydraulic clutch which incorporates a sliding vane and eccentrically arranged pumping chamber with centrally controlled bypasses from the high to the low pressure side of the chamber so that control thereof may be readily and quickly effected, and Fifth, to provide on the whole a novelly constructed hydraulic clutch mechanism which is durable, efficient in its action and which will not readily deteriorate or get out of order.

Figure 1:
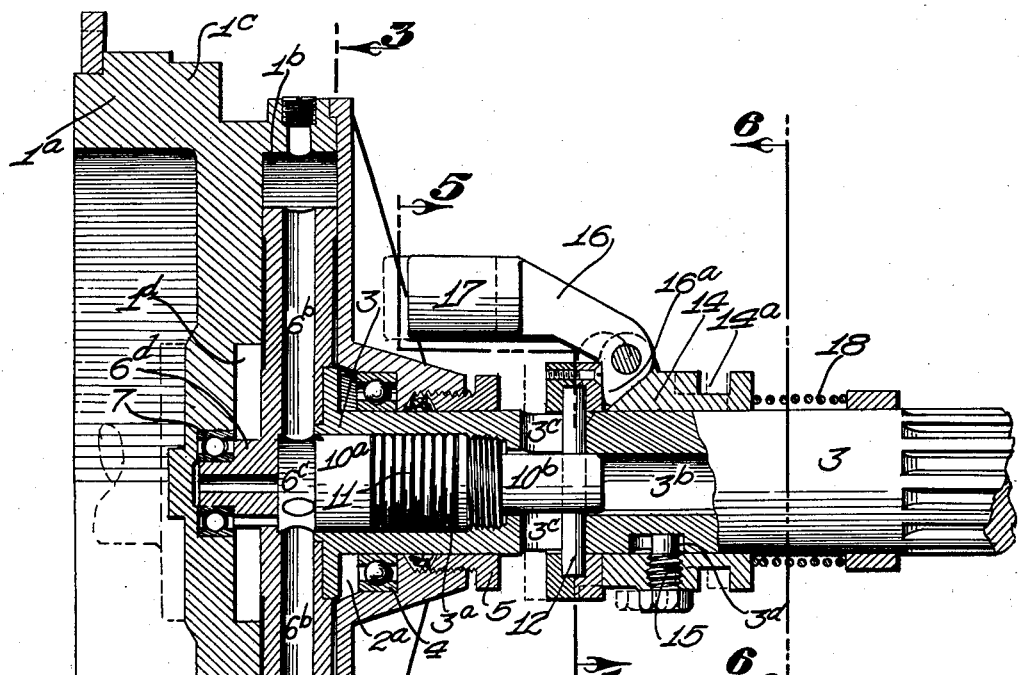
Figure 2:
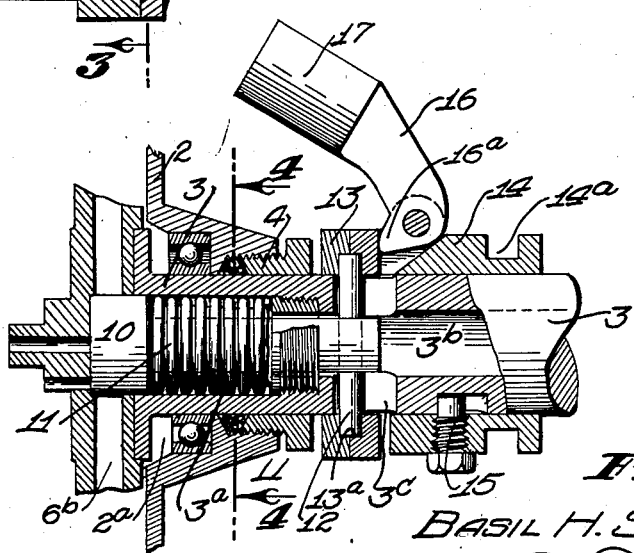
Figure 3:
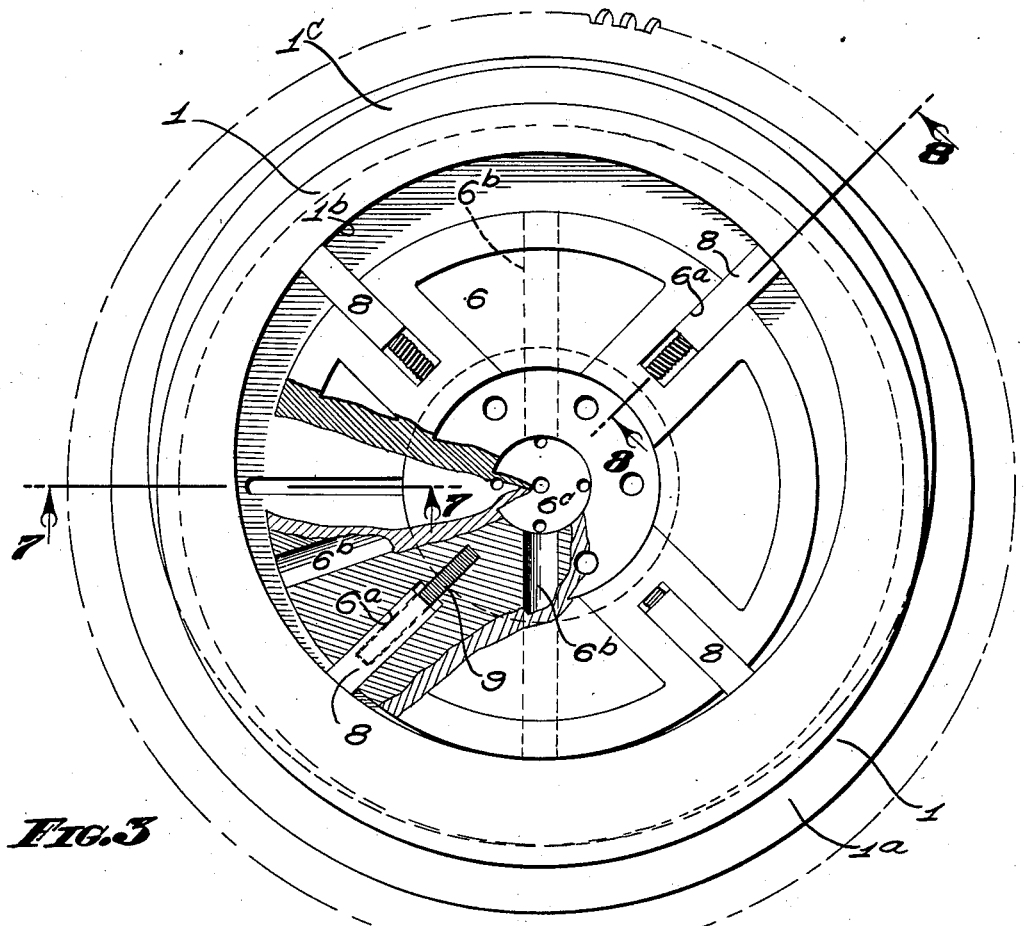
Figure 5:
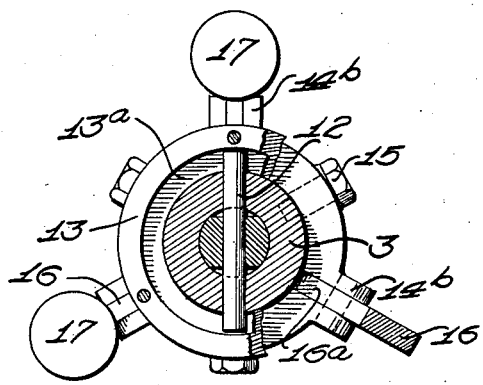
Figure 4:
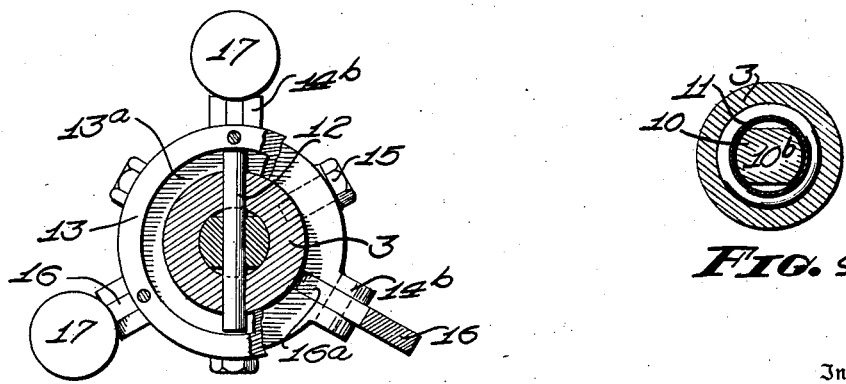

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a longitudinal sectional view of the hydraulic clutch mechanism taken through 1—1 of Fig. 6; Fig. 2 is a fragmentary sectional view similar to Fig. 1 showing the parts in the position assumed when the clutch is in engagement; Fig. 3 is a transverse elevational view taken along the line 3—3 of Fig. 1 with the cover plate of the clutch housing and the stub shaft extending from the rotor removed together with the valve mechanism and with parts and portions broken away and in section to facilitate the illustration; Fig. 4 is a transverse sectional view through 4—4 of Fig. 2 illustrating the stub shaft and flexible partition; Fig. 5 is a transverse sectional view through 5—5 of Fig. 1; Fig. 6 is a transverse sectional view through 6—6 of Fig. 1; Fig. 7 is a fragmentary sectional view through 7—7 of Fig. 3; Fig. 8 is a fragmentary sectional view through 8—8 of Fig. 3, and Fig. 9 is a perspective view of one of the vanes.

Similar characters of reference refer to similar parts and portions throughout the several views of the drawings.

Casing 1, cover 2, shaft 3, bearing 4, packing gland 5, rotor 6, bearing 7, sliding vanes 8, springs 9, valve 10, flexible diaphragm 11, pin 12, collar 13, sleeve 14, set screws 15, levers 16, weights 17 and spring 18 constitute the principal parts and portions of my novel hydraulic clutch.

A casing 1 is provided which is incorporated integrally with a fly wheel 1a adapted to be secured in the conventional manner to the crank shaft of an internal combustion engine. The rear side of the casing 1 is provided with an eccentrically disposed circular recess, designated 1b. Between the recess 1b and the forward side of the fly wheel portion there is provided an eccentrically mounted mass of material, designated 1c, which compensates for the eccentricity of the recess 1b so that the casing 1 may be both dynamically and statically balanced.

The forward side of the casing 1 receives a cover member 2 which is bolted to the casing by its peripherial portion and forms a sealed connection therewith. The cover 2 journals a centrally disposed shaft 3 by means of a bearing 4. The shaft protrudes through a suitable packing gland 5.

The shaft 3 is secured to a rotor 6 which is concentric therewith and mounted in the recess 1b. The forward side of the rotor 6 is provided with a stem 6d which is supported by a bearing 7 in the casing 1, as shown best in Fig. 1.

The rotor 6 is provided with a plurality of equally spaced radiating slots 6a each of which receives a sliding vane 8. Coil springs 9 fit into sockets provided in the bases of the slots 6a and extend into registering sockets provided in the vanes 8 so as to urge the vanes against the inner periphery of the recess 1b. The rotor 6 is also provided with a plurality of diametrically extending passages 6b which intersect its periphery between the several vanes 8. The diametrically extending passages 6b intersect a common recess 6c extending forwardly from the rear side of the rotor.

The shaft 3 is provided with a bore therethrough which is enlarged at its forward end as indicated by 3a. The enlarged portion 3a receives a valve head 10a of a valve member 10. Said valve member includes a valve stem 10b which extends into the constricted portion of the bore, designated 3b. Between the portions 3a and 3b of the bore said bore is internally threaded to receive one end of a flexible diaphragm 11, the remaining end of which is secured to the valve head 10a. Said flexible diaphragm is formed of sheet metal with a series of annular corrugations pressed therein so that the diaphragm is capable of contraction and expansion and serves to prevent leakage between the valve 10 and shaft 3 and also serves to unseat the valve 10 sufficiently to permit the oil to force the valve open. The valve head 10a is adapted to fit into the recess 6c which forms a valve seat therefor.

The rear end of the valve stem 10b receives a transversely extending pin 12 which projects diametrically through slots 3c formed in the shaft 3. The extremities of the pin 12 fit in an annular channel 13a provided in a collar 13 which surrounds the shaft 3, as shown in Figs. 1, 2 and 5.

The shaft 3 supports a sleeve 14 rearwardly of the collar 13. Said sleeve is limited in its axial movement by means of set screws 15 which extend into channels 3d provided in the shaft 3. Said sleeve 14 is provided with an annular channel 14a adapted to receive a yoke or other conventional means connected with a clutch pedal, not shown. The forward end of the sleeve 14 is provided with a plurality of equally spaced bracket portions 14b which are adapted to journal levers 16. Said levers normally extend outwardly and forwardly and terminate in weight portions 17. The remaining legs of the several levers 16 extend radially inwardly into slots provided in the sleeve 14 and form cams or lugs 16a adapted to bear against the rear side of the collar 13, as shown in Figs. 1 and 2. The sleeve 14 tends to move to its forward position by the action of a suitable spring 18.

The cover 2 is provided with a recess 2a surrounding the shaft 3 and adjacent the rotor 6. A similar recess 1d is centered in the recess 1b and is located between the rotor and its bearing 7. The recesses 2a and 1d are intersected by radially extending channels 2b and 1e, respectively. These channels extend to the low side of the rotor. Also the side walls of the rotor inwardly from its peripherial portion are relieved. Further the rotor is provided with a small passage leading from the valve seat 6c to the extremity of the boss 6d and other small ports or passages leading to the shoulder adjacent the bearing support portion of said boss. Any oil that drains into the recess 1d or the recess 2a is withdrawn through the channels 1e and 2b by reason of the fact that the pressure in the low side of the rotor is less. By the "low side" is meant the side in which the chamber formed between the rotor, the recess 1b and vanes 8 is enlarging as the rotor turns.

The pressure side of each vane 8 is provided with one or more longitudinally extending channels 8a which allow oil to pass into and out of the spaces formed between the inner ends of these vanes and the slots 6a. During rotation the pressure of the oil in these spaces aids in holding the vanes against the inner periphery of the recess 1b.

Operation of the hydraulic clutch is as follows: When the valve 10 is withdrawn from the valve seat 6c the clutch is in its neutral position which is the position shown in Fig. 1. When the clutch is in its neutral position the oil which completely fills the base between the rotor and its casing, the various passages and recesses communicating therewith, is free to surge back and forth through the passages 6b passing the recess or valve seat portion 6c. When the clutch pedal is released in the usual manner the spring 18 moves the sleeve 14 forwardly to its extreme position, as shown by dotted lines in Fig. 1, thus partially closing the valve 10 and restricting the flow of oil through the passages 6b, whereupon the shaft 3 is caused to rotate. As the speed of the shaft 3 increases the weights 17 are thrown outwardly by centrifugal force causing the lugs 16a to press forwardly on the collar 13 and further close the valve until at a predetermined speed of the shaft 3 the valve 10 is completely closed and the clutch is "engaged"; that is, the passages 6b are completely shut off and the rotor 6 is secured against movement relative to the casing 1.

It will be here noted that with the above construction and operation that in case of heavy loading or extreme pressure in the clutch mechanism, the shaft 3 will be slowed down causing the weight 17 to move inwardly toward the shaft which will release the member 13 to the extent of said slow down permitting the oil pressure to get behind the valve and move it open sufficiently to eliminate the overloading of the engine as well as excessive pressure in the clutch mechanism.

It will be noted that there is provided slight clearance between the rotor 6 and the casing 1 at the tangent portion to permit a fluid flow and prevent the fluid being trapped between the vane 8 and the point of tangency of the rotor and casing.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a hydraulic clutch, a statically and dynamically balanced fly wheel structure having an eccentrically disposed casing portion, a rotor disposed concentrically with respect to the fly wheel structure and mounted in the casing portion forming therewith a pump chamber, a plurality of vanes dividing said pump chamber into compartments, fluid passages connecting said compartments to permit passage of fluid into and out of said compartments to permit relative movement of the rotor and fly wheel structure, valve means for controlling said passages, and a centrifugally responsive means for operating said valve means.

2. In a hydraulic clutch, a casing means, a rotor mounted therein, said rotor and casing means being relatively eccentric and forming therebetween a fluid chamber, radiating sliding vanes carried by said rotor and engaging the periphery of said casing to divide said chamber into a plurality of compartments, said rotor having passages radiating from a common center to each compartment and a valve seat at the center or juncture of said passages for simultaneously controlling the same, a hollow shaft extending from said rotor through said casing, a valve mounted in said shaft and adapted to engage said seat for controlling said passages to seal said compartments one from the other, and means for operating said valve, said means comprising a centrifugally responsive mechanism engageable with said valve tending to close the same as the speed of the shaft increases, and a manually operated device for shifting said mechanism bodily to effect partial closing of said valve.

BASIL H. SAVAGE.